(12) United States Patent
Pecnik et al.

(10) Patent No.: US 9,358,897 B2
(45) Date of Patent: Jun. 7, 2016

(54) ELECTRIC MOTOR VEHICLE AND REDOX FLOW MODULE AND CARTRIDGE THEREFOR

(75) Inventors: Hermann Pecnik, Nestelbach (AT); Gerald Teuschl, Rauenberg (DE)

(73) Assignee: MAGNA STEYR Fahrzeugtechnik AG & Co KG, Graz (AT)

( * ) Notice: Subject to any disclaimer, the term of this patent is extended or adjusted under 35 U.S.C. 154(b) by 629 days.

(21) Appl. No.: 13/824,217

(22) PCT Filed: Sep. 22, 2011

(86) PCT No.: PCT/EP2011/066480
§ 371 (c)(1),
(2), (4) Date: Jun. 7, 2013

(87) PCT Pub. No.: WO2012/038497
PCT Pub. Date: Mar. 29, 2012

(65) Prior Publication Data
US 2013/0293005 A1    Nov. 7, 2013

(30) Foreign Application Priority Data

Sep. 24, 2010   (DE) .......................... 10 2010 046 388

(51) Int. Cl.
*H02J 7/00*          (2006.01)
*B60L 11/00*         (2006.01)
(Continued)

(52) U.S. Cl.
CPC ......... *B60L 11/1851* (2013.01); *B60L 11/1816* (2013.01); *B60L 11/1822* (2013.01);
(Continued)

(58) Field of Classification Search
CPC ............ B60L 11/1851; B60L 11/1822; B60L 11/1853; B60L 11/1879; B60L 11/1816; B60L 2210/10; B60L 2210/40; H01M 8/04186; H01M 8/188; H01M 8/20; H01M 10/0525; H01M 10/0565; H01M 10/46; H01M 16/006; Y02E 60/122; Y02E 60/528; Y02T 10/7005; Y02T 10/7011; Y02T 10/705; Y02T 10/7072; Y02T 10/7216; Y02T 10/7241; Y02T 90/124; Y02T 90/127; Y02T 90/14; H02J 7/00; H02J 7/14
USPC .......... 320/104, 110, 112, 134, 135; 324/434; 340/636.2; 307/150, 151, 153
See application file for complete search history.

(56) References Cited

U.S. PATENT DOCUMENTS 5,061,578 A  * 10/1991  Kozuma ................. H01M 2/40
                                                  136/291
6,320,358 B2 * 11/2001  Miller ......................... 307/10.1
(Continued)

FOREIGN PATENT DOCUMENTS

DE      10 2008 030343 A1    12/2009
JP           6284509 A         7/1994
(Continued)

OTHER PUBLICATIONS

"Flow Battery", www.wikipedia.org, 9 pages, printed on Dec. 13, 2015.*

*Primary Examiner* — Phallaka Kik
(74) *Attorney, Agent, or Firm* — Jordan IP Law, LLC; Todd A. Vaughn

(57) ABSTRACT

An electric motor vehicle with a drive motor, a first rechargeable battery with a first design and a second rechargeable battery with a second design. Electrical energy may be transferred bidirectionally between the drive motor and the first rechargeable battery, and at least unidirectionally from the second rechargeable battery to the drive motor or the first rechargeable battery. The second rechargeable battery in this case includes at least one redox flow cell. Furthermore, a redox flow module is provided with at least one redox flow cell, which includes an electrical coupling for connection to a circuit of a vehicle and a fluid coupling for connection to an electrolyte circuit of said vehicle.

19 Claims, 4 Drawing Sheets

(51) Int. Cl.
  *H01M 8/00* (2016.01)
  *H01M 10/00* (2006.01)
  *H01M 16/00* (2006.01)
  *B60L 11/18* (2006.01)
  *H01M 8/04* (2016.01)
  *H01M 8/18* (2006.01)
  *H01M 8/20* (2006.01)
  *H01M 10/0525* (2010.01)
  *H01M 10/0565* (2010.01)
  *H01M 10/46* (2006.01)

(52) U.S. Cl.
  CPC ......... *B60L11/1853* (2013.01); *B60L 11/1879* (2013.01); *H01M 8/04186* (2013.01); *H01M 8/188* (2013.01); *H01M 8/20* (2013.01); *H01M 10/0525* (2013.01); *H01M 10/0565* (2013.01); *H01M 10/46* (2013.01); *H01M 16/006* (2013.01); *B60L 2210/10* (2013.01); *B60L 2210/40* (2013.01); *H02J 7/00* (2013.01); *Y02E 60/122* (2013.01); *Y02E 60/528* (2013.01); *Y02T 10/7005* (2013.01); *Y02T 10/705* (2013.01); *Y02T 10/7011* (2013.01); *Y02T 10/7072* (2013.01); *Y02T 10/7216* (2013.01); *Y02T 10/7241* (2013.01); *Y02T 90/124* (2013.01); *Y02T 90/127* (2013.01); *Y02T 90/14* (2013.01)

(56) References Cited

U.S. PATENT DOCUMENTS

| | | | | |
|---|---|---|---|---|
| 6,764,789 B1* | 7/2004 | Sekiguchi | ............ | H01M 8/0291 429/105 |
| 6,793,027 B1* | 9/2004 | Yamada | ................. | B60K 1/04 180/65.1 |
| 8,946,926 B2* | 2/2015 | Eger | ........................ | B60K 6/30 307/10.1 |
| 9,079,501 B2* | 7/2015 | Komiya | ................... | B60L 1/003 |
| 9,227,523 B2* | 1/2016 | King | .................... | B60L 11/1803 |
| 2001/0004205 A1* | 6/2001 | Miller | ................... | H02J 7/1423 323/224 |
| 2002/0015890 A1* | 2/2002 | Nakura | ................... | H01M 4/58 429/231.95 |
| 2003/0222502 A1* | 12/2003 | Takahashi | ............. | B60L 11/005 307/18 |
| 2004/0112320 A1* | 6/2004 | Bolz | ........................ | F02N 11/04 123/179.28 |
| 2004/0222771 A1* | 11/2004 | Iwata | ................... | H02J 7/0016 320/134 |
| 2005/0007042 A1* | 1/2005 | Moore | ................... | A01B 45/02 318/139 |
| 2009/0033254 A1* | 2/2009 | Nagashima | ........... | B60L 11/005 318/139 |
| 2009/0212634 A1* | 8/2009 | Kojima | ................. | B60L 3/0023 307/77 |
| 2010/0090525 A1* | 4/2010 | King | ................... | B60L 11/1868 307/10.1 |
| 2010/0097031 A1* | 4/2010 | King | ................... | B60L 11/1803 320/109 |
| 2010/0156355 A1 | 6/2010 | Bauerle | | |
| 2010/0315043 A1* | 12/2010 | Chau | ..................... | B60L 3/0046 320/134 |
| 2011/0115425 A1* | 5/2011 | Olsson | ................. | B60L 3/0046 320/101 |
| 2011/0223450 A1* | 9/2011 | Horne | ................. | B60L 11/1824 429/72 |
| 2011/0278938 A1* | 11/2011 | McCleer | ............... | H02J 7/0065 307/82 |
| 2012/0153878 A1* | 6/2012 | King | ................... | B60L 11/1803 318/139 |
| 2012/0207620 A1* | 8/2012 | Dalum | .................... | B60K 6/12 417/44.1 |

FOREIGN PATENT DOCUMENTS

| | | | |
|---|---|---|---|
| JP | 7023504 A | | 1/1995 |
| JP | 2003007326 A | * | 1/2003 |
| JP | 2003007327 A | * | 1/2003 |

* cited by examiner

ELECTRIC MOTOR VEHICLE AND REDOX FLOW MODULE AND CARTRIDGE THEREFOR

CROSS-REFERENCE TO RELATED APPLICATIONS

The present application is a National Stage Application of PCT International Application No. PCT/PCT/EP2011/066480 (filed on Sep. 22, 2011), under 35 U.S.C. §371, which claims priority to German Patent Application No. DE 10 2010 046 388.4 (filed on Sep. 24, 2010), which are each hereby incorporated by reference in their complete respective entireties.

TECHNICAL FIELD

The invention relates to an electric motor vehicle, comprising a drive motor, a first rechargeable battery with a first design and a second rechargeable battery with a second design. Electrical energy can be transferred bidirectionally between the drive motor and the first rechargeable battery and at least unidirectionally from the second rechargeable battery to the drive motor or the first rechargeable battery. Furthermore, the invention relates to a redox flow module with at least one redox flow cell.

BACKGROUND

For some time electric motor vehicles have been used both in limited private sectors, for example in the form of fork lift trucks or the like, and in road traffic, for example in the form of passenger vehicles and motor cycles. A considerable problem associated with rechargeable battery-operated vehicles is the restricted range they have, for which reason the use of such vehicles is usually limited to urban traffic and short-distance interurban traffic. A complicating factor is also that electric motor vehicles are only ready to use again after a relatively long charging time of typically 1-2 hours, which is in stark contrast to the very quick filling operation for conventional vehicles, which typically takes less than 5 minutes.

In order to circumvent the problem of the limited energy content of rechargeable batteries, it is known to use additional systems for range extension (range extenders). Range extenders is the term used for additional equipment in an electric motor vehicle which extend the range of the vehicle. Internal combustion engines which drive a generator which in turn supplies power to the rechargeable battery and the electric motor are often used for this purpose. A further example of a range extender is a fuel cell, which can be "refueled" relatively quickly with hydrogen and oxygen. For example, DE 101 33 580 discloses such a vehicle.

One problem with the known apparatuses consists in that they are not emissions-free in the case of the internal combustion engine. An argument against the use of in particular hydrogen-oxygen fuel cells is the high risk potential of the gases required for operating the cell.

It is also known to use redox flow cells for operating an automobile. The redox flow cell is a rechargeable battery which stores electrical energy in chemical compounds, wherein the reaction partners are present in dissolved form in a solvent. The two energy-storing electrolytes circulate in this case in two separate cycles, between which ion exchange takes place in the cell by means of a membrane. The cell voltage of the redox flow cell is between 1.0 and 2.2 V in practical systems. The possibility of exchanging a consumed electrolyte for an unconsumed electrolyte at a filling station is advantageous. The consumed electrolyte can be regenerated there again with current from the public power supply system. The charging or filling operation in this case lasts approximately as long as the filling operation for conventional automobiles.

Problems associated with the use of the redox flow cell in an automobile consist in the low energy content thereof and the poor dynamics. The former prevents long ranges, and the latter prevents quick accelerations of the vehicle. Redox flow cells are therefore only suitable for a niche sector.

SUMMARY

The object of the present invention therefore consists in specifying an improved electric motor vehicle and an improved redox flow module. In particular, the range of electric motor vehicles is intended to be extended without any emissions, without in the process the dynamics of the vehicle being impaired and without in the process the risk of an oxyhydrogen explosion.

The object of the invention is achieved by an electric motor vehicle of the type mentioned at the outset, in which the second rechargeable battery comprises at least one redox flow cell.

Furthermore, the object of the invention is achieved by a redox flow module with at least one redox flow cell, which comprises an electrical coupling for connection to a circuit of a vehicle and a fluid coupling for connection to an electrolyte circuit of said vehicle.

The invention overcomes the disadvantages of the prior art mentioned at the outset. Firstly, the generation of electrical energy takes place without any emissions and with a low risk of accident, and secondly an electric motor vehicle can be "refueled" quickly, but does not suffer from poor dynamics owing to the combination with a first rechargeable battery (provided this has a low internal resistance). The redox flow module in accordance with the invention can also be connected to a vehicle very easily owing to the two couplings.

The object of the invention is also achieved by a cartridge for an electric vehicle which comprises a vessel for holding an electrolyte, which is provided for operation of a redox flow cell, and a fluid coupling for connecting the cartridge to an electrolyte circuit of the vehicle and is portable. In this way, it is possible to operate the vehicle even when the electrolytes carried along in the tanks of the vehicle are consumed or the tanks are completely empty and refueling is temporarily impossible. An enriched electrolyte can be introduced into the electrolyte cycle of the vehicle with the aid of the cartridge. Advantageously, such a cartridge can also be carried along in the trunk of the vehicle, for example. It is conceivable for one cartridge to be provided for each electrolyte or for a cartridge to have separate vessels for two electrolytes. It is then particularly easy to handle the cartridge since one cartridge is sufficient for operation of the vehicle.

Advantageous configurations and developments of the invention are now specified in the dependent claims and in the description accompanying the figures.

It is favorable if the first rechargeable battery is formed from lithium-ion cells and/or lithium polymer cells. Such cells combine a high energy content with a low internal resistance. They therefore ensure good dynamics of the vehicle and a wide "ground coverage range", i.e. without having to refuel the vehicle. Owing to their low internal resistance, they can draw electrical energy quickly, which firstly ensures a short charging operation and secondly enables recuperative or regenerative deceleration of the electric motor vehicle.

It is advantageous if electrical energy is transferable bidirectionally between the second rechargeable battery and the drive motor or the first rechargeable battery. In this way, the second rechargeable battery can also draw recuperative energy which is produced during deceleration of the vehicle.

It is also advantageous if the electric motor vehicle in accordance with the invention comprises a controller, which is set up to transfer electrical energy from the second rechargeable battery to the first rechargeable battery when the energy content of the first rechargeable battery is lower than its maximum energy content minus a first predeterminable differential energy content. In this variant of the invention, the first rechargeable battery is therefore only recharged partially from the second rechargeable battery, for example to 80% of its capacity. This has the advantage that there is always "space" in the first rechargeable battery for recuperative energy. In particular, when a lithium-ion rechargeable battery is provided for the first rechargeable battery, high deceleration values can be achieved owing to the dynamics of the rechargeable battery.

It is also advantageous in this context if the controller is set up to transfer electrical energy from the first to the second rechargeable battery when the energy content of the first rechargeable battery is greater than its maximum energy content minus a second predeterminable differential energy content. In this variant of the invention, energy is transferred from the first to the second rechargeable battery when the first rechargeable battery has drawn a relatively large amount of recuperative energy, for example, and could not draw any more energy or could only draw a little more energy if said first rechargeable battery were not to be discharged. This can take place, for example, over a relatively long descent in which above-average braking is required.

If two different differential energy contents are provided which are in particular greater than zero, hysteresis results, so that oscillation phenomena do not occur during recharging of the rechargeable batteries.

In a further advantageous variant of the invention, the controller is set up to charge the first rechargeable battery and the second rechargeable battery in a charging operation from an electrical power supply system up to the maximum energy content of the first and second rechargeable batteries minus the first differential energy content or the second differential energy content. In this variant of the invention, the electric motor vehicle is not fully recharged during charging from a public power supply system, for example, but only partially, for example to 90%. This is expedient, for example, when the vehicle is travelling from a point at a relatively high sea level to a point at a relatively low sea level. As a result, the potential energy of the vehicle can be transferred to the first rechargeable battery and/or second rechargeable battery and is not lost. The user of the electric motor vehicle can thus save money.

In a further advantageous variant of the invention, the controller is set up to charge the first rechargeable battery in a charging operation from an electrical power supply system up to its maximum energy content minus the first differential energy content or the second differential energy content. This variant of the invention is similar to the previously mentioned variant, but now capacity is left free in the first rechargeable battery (with high dynamics) for drawing recuperative energy. The second rechargeable battery (with low dynamics) which is usually anyhow only indirectly involved (i.e. bypassing the first rechargeable battery) in the drawing of recuperative energy, can be fully recharged, on the other hand.

It is advantageous if the electric motor vehicle comprises an electrical coupling for connecting a redox flow module with at least one redox flow cell to a circuit of the vehicle and a fluid coupling for connecting said redox flow module to an electrolyte circuit of the vehicle. The use of redox flow modules enables a particularly flexible design of the electrical system since redox flow systems can be constructed with different voltages and/or maximum currents without any considerable difficulty.

It is furthermore advantageous if the electric motor vehicle comprises a fluid coupling for connecting a portable cartridge of an electrolyte circuit of the vehicle, which holds at least one electrolyte provided for the operation of the redox flow cell. In this way, it is possible to operate the vehicle even when the electrolytes carried along in the tanks of the vehicle are consumed or the tanks are completely empty and refueling is temporarily impossible.

It is particularly advantageous furthermore if the electric motor vehicle comprises: a tank for an electrolyte, which is provided for the operation of the redox flow cell, in the electrolyte cycle, a bypass line for this tank and at least one valve in the electrolyte cycle for switching said cycle optionally via the tank or the bypass line.

It is thus possible to decouple the tank from the electrolyte circuit, with the result that said circuit only runs via one or more cartridges. This prevents the enriched electrolyte from the cartridge mixing with the consumed electrolyte and therefore reducing the ion concentration.

It is also advantageous if the electric motor vehicle comprises at least one valve in the electrolyte cycle, which enables operation of the redox flow cell either with the aid of an electrolyte stored in a vehicle-side tank or with the aid of the electrolyte contained in the cartridge. In this variant, it is entirely possible to operate the vehicle either with the electrolyte from the vehicle-side tank or with the electrolyte from the cartridge. If only one bypass line is provided for the tank, operation only via the tank is impossible since the cartridges always remain in the electrolyte cycle.

It is favorable if the electric motor vehicle in accordance with the invention or the redox flow module in accordance with the invention or the cartridge comprises a data interface for data interchange between the electric motor vehicle and the redox flow module/the cartridge. For example, for this purpose, a plug-type coupling with electrical contacts for wired data transmission can be provided. Furthermore, data interchange can also take place, for example, via a radio interface or an optical interface.

It is furthermore favorable if the electric motor vehicle in accordance with the invention or the redox flow module in accordance with the invention or the cartridge comprises a mechanical coupling for locking the redox flow module/the cartridge on the vehicle. As a result, the redox flow module/the cartridge cannot become detached unintentionally from the vehicle. Such a coupling can be formed, for example, by a hook, which latches in on the vehicle when the redox flow module/the cartridge is connected.

It is particularly advantageous if the electrical coupling, the fluid coupling and/or the mechanical coupling are designed in such a way that the redox flow module and/or the cartridge can be connected without the use of a tool. In this way, the redox flow module/the cartridge can be connected to the vehicle in a particularly simple manner, which substantially simplifies the maintenance of the vehicle, for example.

It is also particularly advantageous if the electric motor vehicle comprises a plurality of electrical couplings and a plurality of fluid couplings and/or a plurality of data interfaces and mechanical couplings for connecting a plurality of identical redox flow modules or cartridges. In this way, the system can have a particularly simple, modular design by virtue of more or fewer redox flow modules/cartridges being connected to the vehicle in a simple manner.

It is furthermore particularly advantageous if the electric motor vehicle comprises a plurality of electrical couplings and a plurality of fluid couplings and/or a plurality of data interfaces and mechanical couplings for connecting a plurality of different redox flow modules or cartridges. This is a further possibility for the modular design of the system. In contrast to the previously mentioned variant, in this variant redox flow modules/cartridges with different designs can also be connected to the vehicle, however. Thus, the system can under certain circumstances be matched better to a particular specification. In addition, the compatibility is thus increased since the vehicle can also be set up for the connection of redox flow modules/cartridges from different manufacturers or with different country-specific specifications.

It is favorable if the electric motor vehicle comprises means for identifying the number/type of redox flow modules and/or cartridges connected to the vehicle. For example, for this purpose, micro switches can be provided which are actuated on connection of a redox flow module/cartridge to the vehicle and can thus give an indication of the number of connected modules/cartridges. In order to establish the type of redox flow module/cartridge, a memory provided in the redox flow module/cartridge can be read via a data interface, for example. It is also conceivable for the redox flow module/cartridge to comprise a transponder, which contains information on the type of redox flow module/cartridge.

It is particularly advantageous if the electrical coupling and/or the fluid coupling and/or the data interface and/or the mechanical coupling for connecting a redox flow module and for connecting a cartridge are identical. In this way, the electric vehicle can have a particularly flexible design since the interfaces can be occupied either with redox flow modules or with cartridges.

It is particularly advantageous if the voltage at the electrical coupling is at most the touch voltage. In the case of healthy adults, a touch voltage of 50 V AC or 120 V DC is assumed to be a life-threatening situation. Inter alia for children and pets the touch voltage is fixed only to a maximum of 25 V AC or 60 V DC. In this way, therefore, people and animals can be protected from a hazardous electric shock.

Advantageously, the electric motor vehicle in accordance with the invention comprises a voltage converter, which is arranged between the electrical coupling and an electrical power supply system of the vehicle. As an alternative or in addition, the redox flow module in accordance with the invention can also comprise a voltage converter, which is arranged between the electrical coupling and the at least one redox flow cell. In this way, a voltage level of the redox flow module can be matched to a voltage level of a power supply system of the electric motor vehicle.

It is advantageous if the electrical coupling comprises connections for at least two different voltages of a redox flow module. In this way, electrical systems of a vehicle can be supplied different voltages. For example, the redox flow module can comprise, for this purpose, a plurality of series-connected redox flow cells and an electrical coupling with connections for at least two different voltages, wherein the different voltages are produced by being tapped off at different points in the series circuit. In general, a redox flow module comprises a plurality of series-connected redox flow cells (each producing approximately 1.2 to 2.2 V) in order to reach a required voltage of 48 V, for example. By virtue of being tapped off at different points in the series circuit, further voltages, for example 12 V, can be made available. The advantage of using redox flow cells is particularly apparent here since, in contrast to galvanic cells which each contain a specific quantity of an electrolyte, a common electrolyte is provided in a tank for the redox flow cells. Therefore, additional loading of some of the cells owing to said additional voltage tapping is not overly disruptive since these cells are not as a result discharged to any greater extent than the remaining cells of the series circuit. It is naturally also conceivable for a plurality of parallel-connected branches of series-connected redox flow cells to be provided in order to be able to produce a required current.

In this context, it is also advantageous if voltage converters are provided only for some of said connections. In this variant, voltage converters are provided only for those connections for which a redox flow module cannot produce an appropriate voltage. For example, a voltage of 48 V (below the touch voltage) is converted to a higher voltage level by a DC-to-DC converter, while another voltage of 12 V, for example, is not converted any further. The DC-to-DC converter is preferably provided on the vehicle side, but can also be integrated in the redox flow module.

It is particularly advantageous if those connections which have an associated voltage converter are connected to a drive of the electric motor vehicle and those connections which do not have an associated voltage converter are connected to peripheral electrics of the electric motor vehicle. In this context, it is particularly advantageous if the connections associated with the drive have a higher voltage than the connections associated with the peripheral electrics, and the voltage converter is in the form of a step-up converter. For example, for this purpose, a voltage of 48 V can be stepped up to 400 V for the traction drive, whereas the voltage of 12 V is used directly for the peripheral electrics of the electric motor vehicle, i.e. for auxiliaries, step-up motors, entertainment systems or the like. In this way, voltage converters in the low-voltage range which decrease the overall efficiency of the system can be avoided.

Advantageously, the electric motor vehicle in accordance with the invention also comprises at least one isolating relay, which is arranged between the electrical coupling and an electrical power supply system of the vehicle. As an alternative or in addition, the redox flow module in accordance with the invention can also comprise at least one isolating relay, which is arranged between the electrical coupling and the at least one redox flow cell. This is a further measure for protecting people and animals from a hazardous electric shock. This is particularly advantageous when the voltage at the electrical coupling is higher than the touch voltage.

Finally, it is advantageous if means for influencing a throughflow are associated with a fluid coupling of the electric motor vehicle, the redox flow module and/or the cartridge. In this way, the electrolyte throughflow through a redox flow module and/or through a cartridge can be controlled and thus the power output thereof can be influenced. Said means can be formed by valves or slides, for example.

It is noted at this juncture that the variants mentioned in relation to the electric vehicle and the advantages resulting therefrom relate equally to the redox flow module or the cartridge, and vice versa. This particularly applies to the interfaces disclosed.

The above configurations and developments of the invention can be combined as desired.

DRAWINGS

The present invention will be explained in more detail below with reference to the exemplary embodiments specified in the schematic figures of the drawing, in which.

DESCRIPTION

Figure 1:
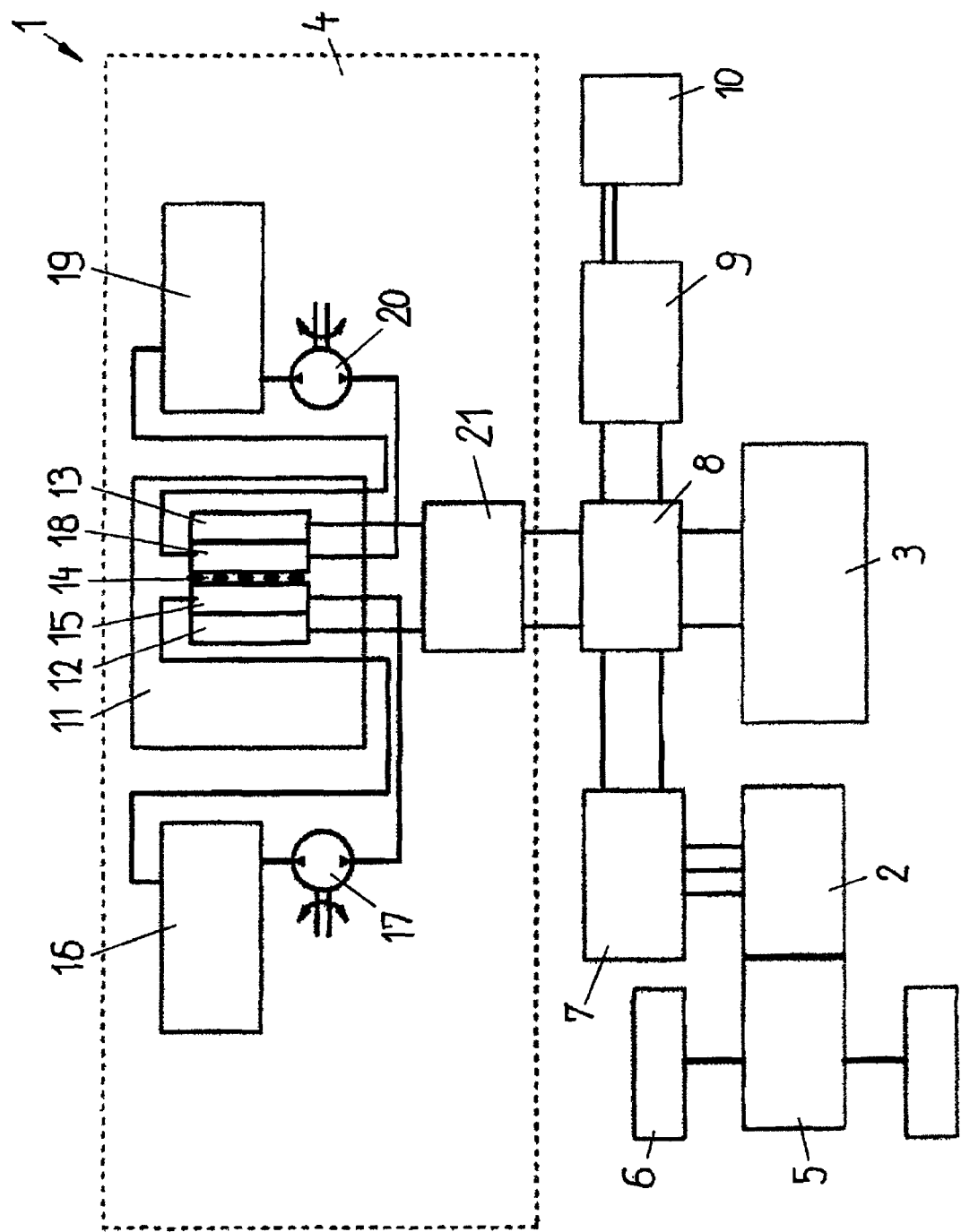
FIG. 1 illustrates a schematic illustration of an electric vehicle in accordance with the invention with a redox flow module connected.

FIG. 1 illustrates an electric motor vehicle 1, comprising a drive motor 2, a first rechargeable battery 3 with a first design and a second rechargeable battery 4 with a second design. The drive motor 2 is connected mechanically to drive wheels 6 via a transmission 5. Furthermore, the drive motor 2 is connected to the first rechargeable battery 3 via a DC-to-AC converter 7 and a central energy distribution unit 8. Furthermore, the second rechargeable battery 4 and a charger 9 are connected to this central energy distribution unit 8, and a charging socket outlet 10 is connected to said charger. The first rechargeable battery 3 is in the form of a lithium-ion rechargeable battery, in this example. However, it goes without saying that the use of other types of rechargeable batteries is also possible, for example lithium polymer rechargeable batteries, as long as the internal resistance of the rechargeable battery is sufficiently low to supply adequate current to the drive motor 2 or to draw recuperative or regenerative braking energy.

The second rechargeable battery 4 comprises at least one redox flow cell 11 (for reasons of clarity only one redox flow cell 11 is shown in FIG. 1. A real rechargeable battery 4 can naturally comprise a large number of parallel-connected and/or series-connected redox flow cells 11). The redox flow cell comprises a cathode 12, an anode 13 and a membrane 14 arranged therebetween. A cathode-side cavity 15 is located between the cathode 12 and the membrane 14 and is incorporated in a cycle which comprises a first electrolyte tank 16, a first pump 17 and precisely this cathode-side cavity 15. Similarly, an anode-side cavity 18 is located between the anode 13 and the membrane 14 and is incorporated in a cycle which comprises a second electrolyte tank 19, a second pump 20 and the mentioned anode-side cavity 18. The cathode 12 and the anode 13 are ultimately connected to the central energy distribution unit 8 via an (optional) DC-to-DC converter 21.

The arrangement illustrates operates as follows:

In a manner known per se, the first rechargeable battery 3 can be charged from the public power supply system via the charging socket outlet 10, the charger 9 and the central energy distribution unit 8. The charger can also be located outside the vehicle 1, in which case the vehicle has only one charging socket outlet 10. In a manner which is likewise known, the electrical energy can be conducted from the first rechargeable battery 3 via the central energy distribution unit 8 and the DC-to-AC converter 7 to the drive motor 2, which drives the drive wheels 6 via the transmission 5. In the present case, a synchronous machine is used as drive motor 2. If, for example, a brushed DC motor is used, the DC-to-AC converter 7 can also be dispensed with. Finally, electrical energy can also be transferred from the drive motor 2 back to the first rechargeable battery 3. In this case, the kinetic energy of the electric motor vehicle 1 during deceleration is conducted from the drive wheels 6 via the transmission 5 to the drive motor 2, which now acts as a generator and converts the kinetic energy into electrical energy. This is conducted via the DC-to-AC converter 7 (which now actually acts as an AC-to-DC converter) and via the central energy distribution unit 8 to the first rechargeable battery 3. Electrical energy can thus be transferred bidirectionally between the drive motor 2 and the first rechargeable battery 3.

In accordance with the invention, electrical energy can also be conducted from the second rechargeable battery 4 to the drive motor 2. This takes place via the central energy distribution unit 8 and the DC-to-AC converter 7. In the present example, it is furthermore assumed that the energy transfer is possible bidirectionally, i.e. that electrical energy can also be transferred from the drive motor 2 acting as generator to the second rechargeable battery 4. However, this circumstance is not essential to the invention. The second rechargeable battery 4 can also be charged from a public power supply system via the charging socket outlet 10, the charger 9 and the central energy distribution unit 8. A further possibility for charging the second rechargeable battery 4 consists in replacing consumed electrolytes in the first electrolyte tank 16 and in the second electrolyte tank 19. This can take place, for example, at a filling station which makes available unconsumed electrolytes. In this case, the electrolytes are replaced via valves or connections which are arranged on the first pump 17 or on the second pump 20. The second rechargeable battery 4 is therefore eminently suitable, inter alia, for range extension (range extender) of the electric motor vehicle 1.

During the current generation, the two electrolytes are passed via the first pump 17 or the second pump 20 to the redox flow cell 11. Specifically, the first electrolyte is pumped into the cathode-side cavity 15, and the second electrolyte is pumped into the anode-side cavity 18. As a result, positive charge carriers collect at the cathode 12 and negative charge carriers collect at the anode 13. Thus, for example, the drive motor 2 can be supplied electrical energy.

This invention combines the advantages of two different types of rechargeable batteries. Firstly, the lithium-ion rechargeable battery 3, owing to its low internal resistance, ensures quick energy transfer. Said rechargeable battery can therefore provide the electrical power for high acceleration values of the electric motor vehicle 1 or else draw back the energy produced during heavy deceleration of the electric motor vehicle 1. In contrast to this there is the redox flow rechargeable battery 4, which generally has lower dynamics than, for example, a lithium-ion rechargeable battery and therefore cannot transfer electrical energy as quickly. A considerable advantage of the second rechargeable battery 4, however, is the possibility of "refueling" said rechargeable battery at a filling station. This operation requires substantially the same amount of time as that required for refueling petrol or diesel vehicles, and therefore less time than is generally required for recharging a rechargeable battery from the public power supply system. The electric motor vehicle 1 in accordance with the invention can therefore draw recuperative energy quickly but can also be refueled quickly.

In an advantageous variant, the electric motor vehicle 1 comprises a controller, which is set up to transfer electrical energy from the second rechargeable battery 4 to the first rechargeable battery 3 when the energy content of the first rechargeable battery 3 is lower than its maximum energy content minus a first predeterminable differential energy content. In this variant, the first rechargeable battery 3 is recharged from the second rechargeable battery 4 as required or automatically, but only in each case to part of its maximum capacity, for example to 80%. This has the advantage that the first rechargeable battery 3 can then also still draw recuperative energy when it has just been recharged. If the first rechargeable battery 3 were to be fully recharged, on the other hand, it would not be possible at this time for any more recuperative energy to be drawn, which would mean that the braking energy required for decelerating the electric motor vehicle 1 would need to be converted into thermal energy and would therefore be lost.

In one variant, electrical energy can also be transferred from the first rechargeable battery 3 to the second rechargeable battery 4. This takes place again by virtue of the controller, which is now also set up to transfer electrical energy from the first rechargeable battery 3 to the second rechargeable battery 4 when the energy content of the first rechargeable battery 3 is greater than its maximum energy content minus a second predeterminable differential energy content. In this way, recuperative energy which has been transferred to the first rechargeable battery 3 can be "put to one side" in order to provide space for new recuperative energy. For this purpose, the energy is transferred to the second rechargeable battery 4. It is of course possible for the second predeterminable differential energy content used for this to be identical to the above-mentioned first differential energy content. However, this can result in oscillations, for which reason the provision of a hysteresis is advantageous.

In this context, it is also useful if the controller is set up to charge the first rechargeable battery 3 and the second rechargeable battery 4 in a charging operation from an electrical power supply system up to the maximum energy content of the first and second rechargeable batteries 3 and 4 minus the first differential energy content or the second differential energy content. In this variant of the invention, the electric motor vehicle 1 is therefore not fully charged, but only partially, for example to 95%. This is expedient, for example, when the vehicle 1 is travelling from a point at a relatively high sea level to a point at a relatively low sea level. Owing to the variant in accordance with the invention, the potential energy can be transferred to the first rechargeable battery 3 and/or second rechargeable battery 4 and is thus not lost. The user of the electric motor vehicle 1 can thus save money.

In one variant, the first rechargeable battery 3 can be charged in a charging operation from an electrical power supply system up to its maximum energy content minus the first differential energy content or the second differential energy content in order to retain the possibility of storing recuperative energy in the first rechargeable battery 3. The second rechargeable battery 4, which is usually anyway only indirectly involved (i.e. by bypassing the first rechargeable battery 3) in the drawing of recuperative energy, can be fully charged, on the other hand.

In order to provide the system with a modular design, but also for simplified maintenance, the second rechargeable battery 4 can comprise a plurality of redox flow modules, which in turn comprise at least one redox flow cell 11. In FIG. 1, the redox flow module, since it only comprises one redox flow cell 11, is identical to the redox flow cell 11. However, this is in no way obligatory. A redox flow module can also comprise a plurality of redox flow cells 11. These can be connected electrically in series and/or in parallel. Likewise, said redox flow cells can also be connected in series and/or in parallel in respect of the electrolyte cycle. In this case, an electrical parallel circuit in no way necessitates a parallel connection in respect of the electrolyte cycle. An electrical parallel circuit can also be combined with a hydraulic series connection, and vice versa.

In order to achieve the connection of a redox flow module to the vehicle 1, said redox flow module comprises an electrical coupling which can be used to connect the redox flow module to the circuit of the electric motor vehicle 1, in this case specifically to the central energy distribution unit 8, and a fluid coupling which can be used to connect the redox flow module to an electrolyte cycle of the vehicle 1. Specifically, the redox flow module is connected to the first cycle, in which the first electrolyte tank 16 is incorporated, and to the second cycle in which the second electrolyte tank 19 is incorporated.

It is also conceivable for the redox flow module to comprise a data interface for data interchange between the electric motor vehicle 1 and the redox flow module. For example, a plug-type coupling which comprises contacts for transmitting electrical energy between the redox flow module and the electric motor vehicle 1 and therefore forms the above-mentioned electrical coupling, can also have electrical contacts for wired data transmission. Furthermore, data interchange can also take place via radio or optically, for example.

Advantageously, the redox flow module also comprises a mechanical coupling for locking the redox flow module on the vehicle 1, with the result that the redox flow module cannot become detached from the vehicle 1 unintentionally. In particular, the electrical coupling, the fluid coupling or the mechanical coupling are designed in such a way that the redox flow module can be connected without the use of a tool. In this way, the connection of a redox flow module to the vehicle 1 is possible in a particularly simple manner.

Figure 2:
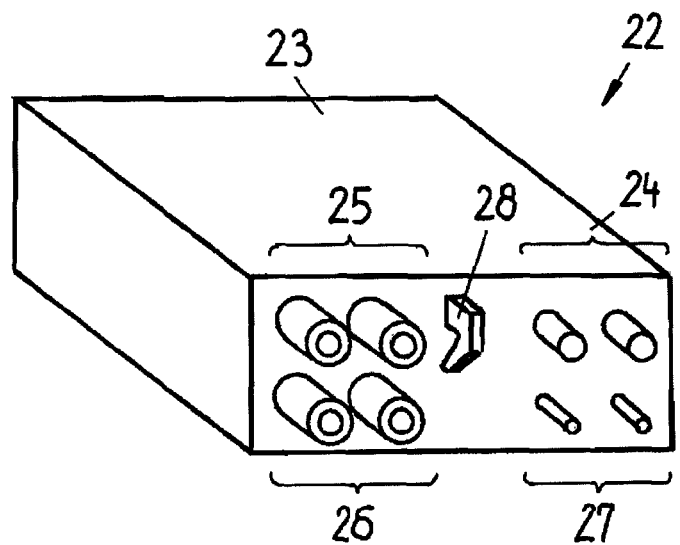
FIG. 2 illustrates an exemplary redox flow module in accordance with the invention.

FIG. 2 now illustrates a possible embodiment of a redox flow module 22. Said redox flow module in this case comprises a right-parallelepipedal housing 23, which comprises the electrical coupling in the form of two connection pins 24 on the end side. Furthermore, a flow and a return 25 for the first electrolyte cycle and a flow and a return 26 for the second electrolyte cycle are provided on the end side. In addition, two pins 27 are arranged on the end side which are provided for data transmission between the redox flow module 22 and the vehicle 1. Finally, the redox flow module 22 comprises a hook 28 on the end side which effects the locking of the redox flow module 22 on the vehicle 1. In order to connect the redox flow module 22 to the vehicle 1, said redox flow module is simply pushed into a shaft provided for this on the vehicle 1, where it latches in, for example. It is of course possible for the vehicle 1 to also have a plurality of such shafts for the connection of a plurality of identical or else for the connection of different redox flow modules 22. In this way, the vehicle 1 can, if required, be equipped with a different number of redox flow modules 22 or else different types of redox flow modules 22. Advantageously, the vehicle 1 then comprises means for detecting the number of redox flow modules 22 connected to the vehicle. For example, for this purpose, a voltage, a current or a resistance can be measured at the vehicle-side sockets, which are associated with the pins 24 or 27. If a voltage not equal to zero, a current not equal to zero or a resistance not equal to infinity is measured, it can be assumed that a redox flow module 22 has been pushed into the relevant shaft. Furthermore, the vehicle 1 can also comprise means for establishing the type of redox flow modules 22 connected to the vehicle 1. For example, a memory provided for this purpose in the redox flow module 22 can be read via the data interface 27. It is also conceivable for the redox flow module 22 to comprise a transponder, which contains information on the type of redox flow module 22.

In a further advantageous variant of the redox flow module 22, the electrical voltage at the pins 24 (i.e. at the electrical coupling) and at the pins 27 is at most the touch voltage. For healthy adults, a touch voltage of over 50 V AC or 120 V DC can be assumed to be a life-threatening situation. Inter alia for children and pets, the touch voltage is only set at at most 25 V AC or 60 V DC. In this way, therefore, people and animals can be protected from a hazardous electric shock.

Advantageously, the redox flow module 22 and/or the vehicle 1 comprises a voltage converter 21 for matching the voltage present in the redox flow module 22 to the voltage used in the vehicle 1 (depending on the number of redox flow cells 11 incorporated).

It is further advantageous if an isolating relay is arranged between the electrical coupling 24 and the redox flow cells 11 and/or if an isolating relay is arranged between the electrical coupling and an electrical power supply system of the vehicle 1. This is a further measure for protecting people and animals from a hazardous electric shock. This is particularly advantageous when the voltage at the pins 24 or at the pins 27 is higher than the touch voltage during operation.

Finally, it is also conceivable for means for influencing a throughflow, for example valves or slides, to be associated with a fluid coupling 25, 26. In this way, the electrolyte throughflow through a redox flow module 22 can be controlled and thus the power output thereof influenced.

Figure 3:
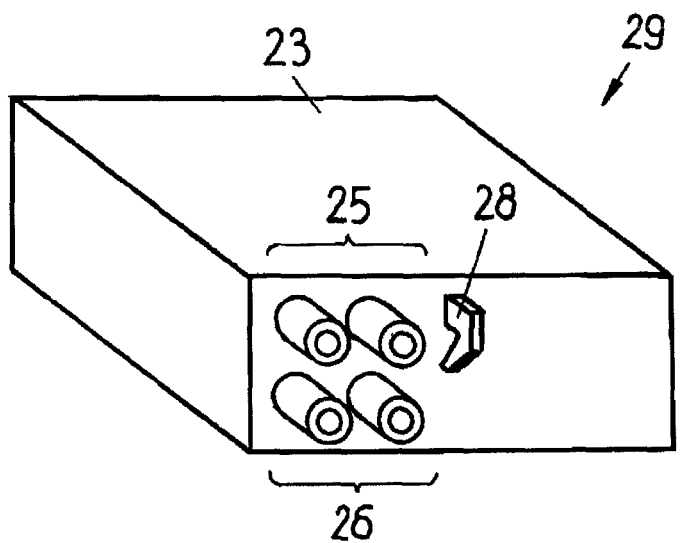
FIG. 3 illustrates an exemplary cartridge in accordance with the invention.

FIG. 3 illustrates an exemplary cartridge 29 in accordance with the invention with a right-parallelepipedal housing 23, which comprises a flow and a return 25 for the first electrolyte cycle and a flow and a return 26 for the second electrolyte cycle on the end side. In addition, the cartridge 29 comprises a hook 28 on the end side, which effects the locking of said cartridge on the vehicle 1. In order to connect the cartridge 29 to the vehicle 1, it is simply pushed into a shaft provided for this on the vehicle 1, for example, where it latches in. It is of course also possible for the vehicle 1 to have a plurality of such shafts for the connection of a plurality of identical or else for the connection of different cartridges 29. In this way, the vehicle 1 can, if required, be equipped with a different number of cartridges 29 or else different types of cartridges 29.

As can be seen from FIGS. 2 and 3, the redox flow module 22 and the cartridge 29 in this example have the same external dimensions and identical interfaces 25 and 26. The use of redox flow modules 22 and cartridges 29 can therefore be particularly flexible since only one type of plug-in shaft for the connection of both a redox flow module 22 and a cartridge 29 needs to be provided on the vehicle side. It is of course possible for the housing 23 of the cartridge 29 to also be configured so as to be larger given the same interface 25 and 26 in order to be able to hold a greater quantity of an electrolyte.

In the present example, the cartridge 29 holds both electrolytes required for the operation of a redox flow cell 11. However, it is also conceivable for said cartridge only to contain one of the two electrolytes. In this case, only the interface 25 for the first electrolyte or the interface 26 for the second electrolyte needs to be provided. It is naturally also conceivable for the interfaces for the redox flow module 22 and the cartridge 29 to be configured completely differently.

In a further variant, the vehicle 1 comprises means for identifying the number of cartridges 29 connected to the vehicle. For this purpose, a cartridge 29 can comprise a data interface (not illustrated) similar or identical to the interface 27 of the redox flow module 22. The evaluation of the data can take place as already described in relation to the redox flow module 22.

Figure 4:
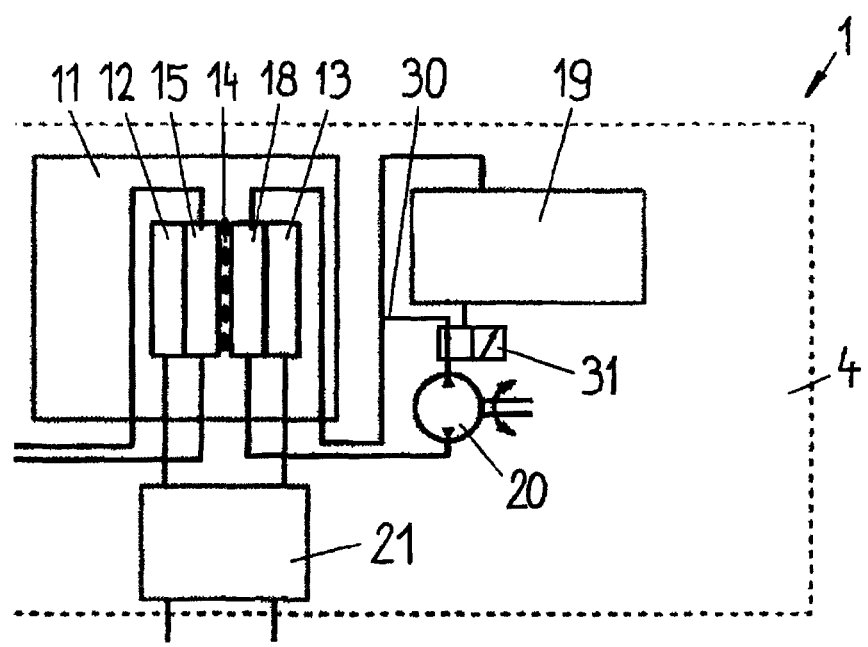
FIG. 4 illustrates a detail of a schematic illustration of an electric vehicle in accordance with the invention with a bypass line for the electrolyte tank.

FIG. 4 now illustrates a detail of a schematic illustration of an electric vehicle in accordance with the invention which is very similar to the illustration shown in FIG. 1. However, a bypass line 30 is provided for the second electrolyte tank 19. The electrolyte cycle can, if necessary, be conducted via the tank 19 or via the bypass line 30 by means of the valve 31. It is thus possible to decouple the tank 19 from the electrolyte cycle, with the result that it only passes via one or more cartridges 29 (not illustrated). This prevents the enriched electrolyte from the cartridge 29 from mixing with the consumed electrolyte and the ion concentration therefore being reduced. It is of course possible for an identical or similar arrangement to be provided for the first electrolyte tank 16 as well.

It is also conceivable for the electric motor vehicle 1 to comprise at least one valve in the electrolyte cycle, which enables the operation of the redox flow cell 11 either with the aid of an electrolyte stored in a vehicle-side tank 16, 19 or with the aid of the electrolyte contained in the cartridge 29. For example, for this purpose, the cartridge 29 can have an associated further bypass line with a switchover valve.

Figure 5:
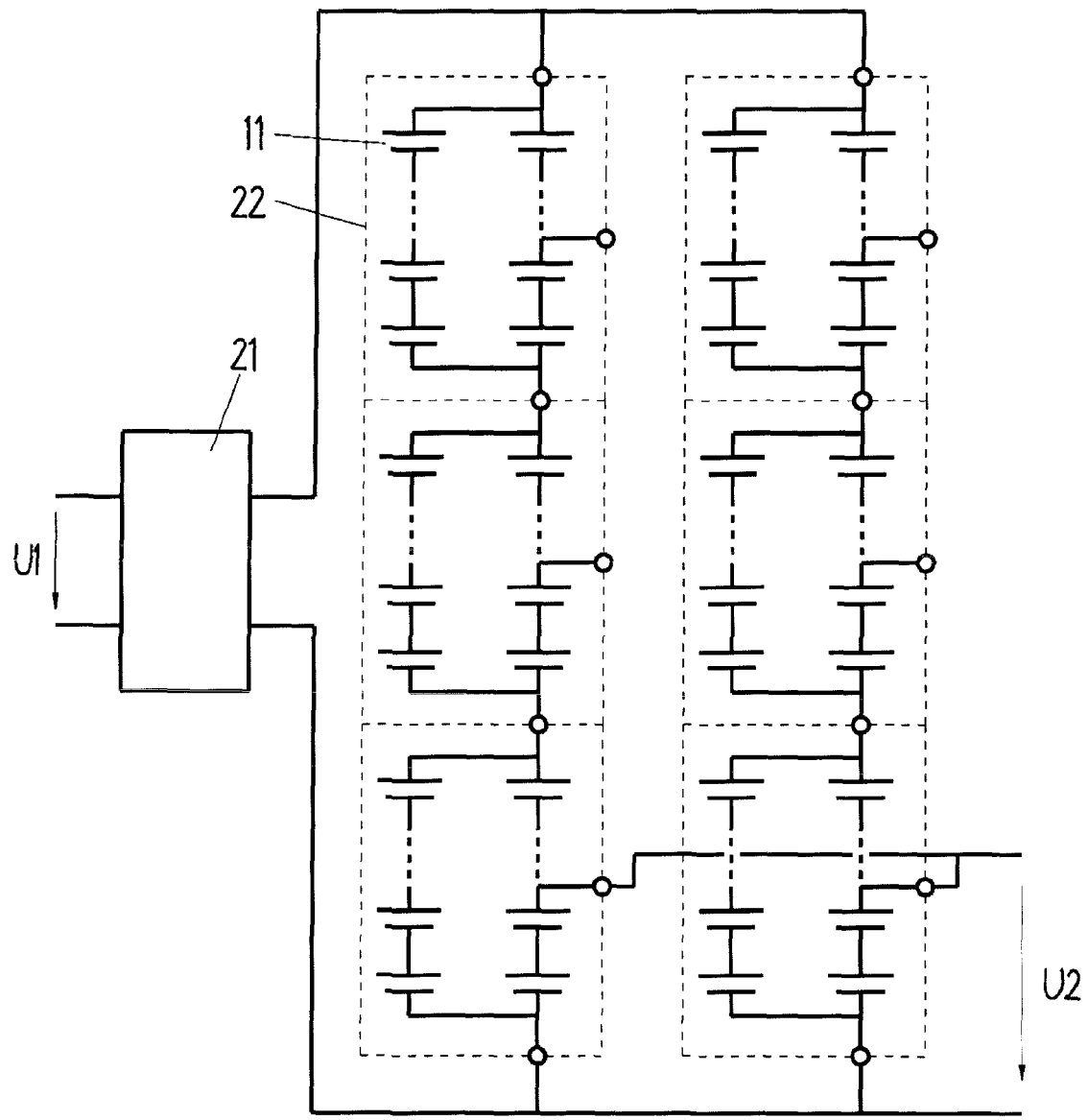
FIG. 5 illustrates an exemplary electrical interconnection of a plurality of redox flow modules.

Finally, FIG. 5 illustrates an exemplary electrical interconnection of a plurality of redox flow modules 22. In this case, each redox flow module 22 comprises a plurality of redox flow cells 11. Specifically, in each case a plurality of redox flow cells 11 are connected in series in order to achieve a required voltage per redox flow module 22, for example 48 V. In order to achieve a required current, two such branches are connected in parallel per redox flow module 22. In addition, each redox flow module 22 comprises a tap at the series circuit for a second, relatively low voltage, for example 12 V. In the present example, the low-voltage tap is only associated with one of the two branches of the series-connected redox flow cells 11, for reasons of simplicity. However, it is naturally also possible for the two branches to be connected at the level of the tap in order to be able to provide a relatively high maximum current in the low-voltage region.

In this example, two series branches are connected in parallel on the vehicle side, said series branches each comprising three redox flow modules 22. It goes without saying that FIG. 5 is merely intended to illustrate the invention. As a deviation from FIG. 5, other circuit variants are also possible in order to be able to provide a required voltage and a required current. In particular, it is possible to connect redox flow modules 22 in principle in parallel on the vehicle side, with the result that failure of a single module 22 has little effect. In the present example, failure of a module 22 results in failure of a branch with three modules 22.

In this example, therefore, 3×48 V are connected in series in order to achieve a voltage of 144 V. In this example, this voltage is once again stepped up with the aid of a DC-to-DC converter 21, for example to 400 V (U1), and made available to the drive branch of the vehicle 1. Furthermore, the 12 V taps (U2) of the redox flow modules 22 are connected in parallel at the lowest voltage potential and are made available for the peripheral electrics of the vehicle 1. Since no voltage converters are required for this purpose, the system operates with particularly high efficiency.

Finally, it will be mentioned that the component parts in the figures may not be true to scale and that the individual variants illustrated in the FIGS. can also form the subject matter of an independent invention.

What is claimed is:

1. An electric motor vehicle, comprising:
    a drive motor;
    a first rechargeable battery of a first type of rechargeable battery, and configured such that electrical energy is transferable bi-directionally between the drive motor and the first rechargeable battery;
    a second rechargeable battery of a second type of rechargeable battery different than the first type of rechargeable battery, and configured such that electrical energy is transferable at least uni-directionally from the second rechargeable battery to one of the driver motor and the first rechargeable battery, the second rechargeable battery comprising at least one redox flow cell;
a portable cartridge holding at least one electrolyte provided for the operation of the redox flow cell; and
a fluid coupling configured to connect the portable cartridge to an electrolyte circuit of the motor vehicle.

2. The electric motor vehicle of claim 1, wherein the first rechargeable battery comprises lithium-ion cells and/or lithium polymer cells.

3. The electric motor vehicle of claim 1, wherein electrical energy is transferable bi-directionally between the second rechargeable battery and one of the drive motor and the first rechargeable battery.

4. The electric motor vehicle of claim 1, further comprising a controller configured to determine for the first rechargeable battery an energy content lower than a maximum energy content of the first rechargeable battery minus a first predeterminable differential energy content, and transfer electrical energy from the second rechargeable battery to the first rechargeable battery responsive to the determination.

5. The electric motor vehicle of claim 1, further comprising a controller configured to determine for the first rechargeable battery an energy content greater than a maximum energy content of the first rechargeable battery minus a second predeterminable differential energy content, and transfer electrical energy from the first rechargeable battery to the second rechargeable battery responsive to the determination.

6. The electric motor vehicle of claim 1, wherein a controller is configured to determine a maximum energy content of the first rechargeable battery and the second rechargeable battery minus a first differential energy content or a second differential energy content, and responsive to the determination, charge the first rechargeable battery and the second rechargeable battery in a charging operation from an electrical power supply system.

7. The electric motor vehicle of claim 1, further comprising a controller configured to determine a maximum energy content of the first rechargeable battery minus one of a first differential energy content and a second differential energy content, and responsive to the determination, charge the first rechargeable battery in a charging operation from an electrical power supply system.

8. The electric motor vehicle of claim 1, further comprising:
a redox flow module comprising the at least one redox flow cell; and
an electrical coupling configured to connect the redox flow module to a circuit of the motor vehicle.

9. The electric motor vehicle of claim 8, further comprising a voltage converter arranged between the electrical coupling and an electrical power supply system of the motor vehicle.

10. The electric motor vehicle of claim 8, wherein:
the redox flow module is configured to produce at least two different voltages; and
the electrical coupling is further configured to electrically connect the at least two different voltages of the redox flow module.

11. The electric motor vehicle of claim 8, further comprising at least one isolating relay arranged between the electrical coupling and an electrical power supply system of the vehicle.

12. The electric motor vehicle of claim 1, further comprising:
a tank configured to store another electrolyte in the electrolyte cycle;
a bypass line for the tank; and
at least one valve in the electrolyte cycle configured to switch the electrolyte cycle via one of the tank and the bypass line.

13. The electric motor vehicle of claim 1, further comprising:
a vehicle-side tank configured to store another electrolyte; and
at least one valve in the electrolyte cycle configured to enable operation of the redox flow cell with the aid of one of the another electrolyte stored in the vehicle-side tank and the at least one electrolyte contained in the portable cartridge.

14. The electric motor vehicle of claim 1, further comprising a data interface configured to permit data interchange between the electric motor vehicle and one of a redox flow module and a cartridge.

15. The electric motor vehicle of claim 14, further comprising a mechanical coupling configured to lock one of the redox flow module and the cartridge on the vehicle.

16. The electric motor vehicle of claim 15, further comprising:
an electrical coupling configured to connect the redox flow module to a circuit of the motor vehicle, wherein the redox flow module comprises the at least one redox flow cell; and
wherein at least one of the electrical coupling, the fluid coupling and the mechanical coupling are configured such that at least one of the redox flow module and the cartridge is connected without the use of a tool.

17. The electric motor vehicle of claim 1, further comprising:
a plurality of electrical couplings configured to electrically connect at least one of a plurality of identical redox flow modules and a plurality of identical cartridges;
a plurality of fluid couplings configured to fluidically connect at least one of the plurality of identical redox flow modules and the plurality of identical cartridges;
a plurality of data interfaces configured to connect at least one of the plurality of identical redox flow modules and the plurality of identical cartridges; and
a plurality of mechanical couplings configured to mechanically connect at least one of the plurality of identical redox flow modules and the plurality of identical cartridges.

18. The electric motor vehicle of claim 1, further comprising:
a plurality of electrical couplings configured to electrically connect at least one of a plurality of different redox flow modules and a plurality of different cartridges;
a plurality of fluid couplings configured to fluidically connect at least one of a plurality of identical redox flow modules and the plurality of different cartridges;
a plurality of data interfaces configured to connect at least one of the plurality of identical redox flow modules and the plurality of different cartridges; and
a plurality of mechanical couplings configured to mechanically connect at least one of the plurality of identical redox flow modules and the plurality of different cartridges.

19. The electric motor vehicle of claim 1, further comprising a device configured to identify at least one of a number and type of at least one redox flow modules and cartridges connected to the motor vehicle.

* * * * *